United States Patent [19]

Mizuno et al.

[11] Patent Number: 4,767,309

[45] Date of Patent: Aug. 30, 1988

[54] EXTRUDING DIE FOR FORMING FINNED CERAMIC HONEYCOMB STRUCTURES

[75] Inventors: Hiroshige Mizuno, Tajimi; Satoru Inoue, Aichi, both of Japan

[73] Assignee: NGK Insulators, Ltd., Nagoya, Japan

[21] Appl. No.: 58,123

[22] Filed: Jun. 4, 1987

[30] Foreign Application Priority Data

Jun. 17, 1986 [JP] Japan ................................ 61-139112

[51] Int. Cl.[4] ........................ B28B 21/54; B29C 47/12

[52] U.S. Cl. ................................ 425/461; 264/177.11; 264/177.12; 264/209.1; 425/464

[58] Field of Search ............ 264/103, 147, 173, 176.1, 264/177.1, 177.11–177.15, 209.1; 425/192, 197, 461–467

[56] References Cited

U.S. PATENT DOCUMENTS

| | | | |
|---|---|---|---|
| 3,109,195 | 11/1963 | Combs et al. | 425/464 |
| 3,164,948 | 1/1965 | Stratford | 264/177.13 |
| 3,349,434 | 10/1967 | Hureau | 425/465 |
| 3,608,138 | 9/1971 | Marcovitch | 264/177.14 |
| 3,620,703 | 11/1971 | Evans et al. | 425/465 |
| 3,705,617 | 12/1972 | Miller et al. | 165/1 |
| 3,738,789 | 6/1973 | Shemdin | 425/464 |
| 3,790,654 | 2/1974 | Bagley | 264/177.11 |
| 3,853,485 | 12/1974 | Hogan | 23/288 F |
| 3,885,977 | 5/1975 | Lachman et al. | 106/62 |
| 3,899,326 | 8/1975 | Frost et al. | 75/214 |
| 3,903,341 | 9/1975 | Gerhold | 428/116 |
| 3,905,743 | 9/1975 | Bagley | 425/464 |
| 3,982,100 | 9/1976 | Hervert | 219/553 |
| 3,983,283 | 9/1976 | Bagley | 428/116 |
| 4,011,038 | 3/1977 | Willemsen | 425/464 |
| 4,233,351 | 11/1980 | Okumura et al. | 502/439 |
| 4,243,370 | 1/1980 | Higuchi et al. | 425/462 |
| 4,283,210 | 8/1981 | Mochida et al. | 55/523 |
| 4,290,743 | 9/1981 | Suzuki | 425/464 |
| 4,340,501 | 7/1982 | Davidson | 252/373 |
| 4,350,613 | 9/1982 | Nishino et al. | 252/455 R |
| 4,364,761 | 12/1982 | Berg et al. | 55/523 |
| 4,404,007 | 9/1983 | Tukao et al. | 55/523 |
| 4,425,305 | 1/1984 | Retallick | 422/180 |
| 4,556,543 | 12/1985 | Mochida et al. | 422/171 |
| 4,643,749 | 2/1987 | Miura | 55/523 |
| 4,645,700 | 2/1987 | Matsuhisa et al. | 428/116 |

FOREIGN PATENT DOCUMENTS

| | | |
|---|---|---|
| 211284 | 7/1984 | German Democratic Rep. . |
| 51-1232 | 1/1976 | Japan . |
| 54-8661 | 1/1979 | Japan . |
| 57-61592 | 12/1982 | Japan . |
| 61-167798 | 7/1986 | Japan . |

*Primary Examiner*—Jay H. Woo
*Assistant Examiner*—C. Scott Bushey
*Attorney, Agent, or Firm*—Parkhurst & Oliff

[57] ABSTRACT

An extruding die for forming finned ceramic honeycomb structures includes extruding forming grooves for extruding a ceramic material therethrough and a plurality of material supply apertures for supplying the ceramic material into the extruding die. The extruding forming grooves open at a front surface of the extruding die and intersect with each other in the form of a mesh corresponding to a sectional configuration of a ceramic honeycomb structure. The material supply apertures open at a rear surface of the extruding die and communicate with the extruding forming grooves at intersecting zones thereof. The extruding die comprises fin forming grooves branched from the extruding forming grooves for forming fins, and the material supply apertures communicate with at least parts of the fin forming grooves. In extruding a ceramic material with this extruding die to form a ceramic honeycomb structure, it is easily formed uniform in density in its entirety including fins, thereby completely preventing the fins from falling off during extruding and preventing cracks from occurring in drying or firing.

9 Claims, 6 Drawing Sheets

EXTRUDING DIE FOR FORMING FINNED CERAMIC HONEYCOMB STRUCTURES

BACKGROUND OF THE INVENTION

This invention relates to an extruding die for forming finned honeycomb structures by extruding.

Ceramic honeycomb structures have been widely used for catalyzer carriers for purifying exhaust gases from internal combustion engines, filters for removing fine particles in the exhaust gases and heat exchange elements for the exhaust gases, because the ceramic honeycomb structures are superior in heat resistance and corrosive resistance and have wide surfaces contacting combustion gases with less pressure losses.

In general, the ceramic honeycomb structures are manufactured by the forming method with extruding dies.

An extruding die for this purpose has been known from, for example, Japanese Patent Application Publication No. 61,592/82 whose die is provided with tapered portions between honeycomb forming grooves and extruding supply apertures for forming raw material into a honeycomb structure. Another extruding die has been known from Japanese Patent Application Publication No. 1,232/76, wherein a solid block is provided with first and second channels, and supplied material is extruded from the first channels to the second channels to form a module. Moreover, a further die has been known from Japanese Laid-open Patent Application No. 54-8,661, wherein a feed hole member and an extruding slot member are formed with feed holes and extruding slots, respectively and small apertures are provided therebetween. Furthermore, U.S. Pat. No. 3,038,201 disclosed a die which comprises forming material supply apertures into which a ceramic material is first supplied from an extruder, grid-shaped forming slots and pooling areas between the supply apertures and the forming slots for temporarily accumulating the ceramic material therein.

With all these extruding dies, the supply apertures for the ceramic material are opened at intersections of the extruding slots and communicated therewith, and only partition walls of honeycomb structures are formed by the ceramic material supplied into the supply apertures. A die for forming finned ceramic honeycomb structures has not been known yet.

In recent years, attempt has been made to enlarge surface areas per unit volumes of the ceramic honeycomb structures in order to improve the purifying performance of catalyzer and filtering performance.

For this purpose, a finned ceramic honeycomb structure (Japanese Patent Application No. 7,362/85) has been proposed. The inventors of the present application attempted to produce the proposed finned ceramic honeycomb structure by applying the above described extruding dies of the prior art.

In the case where finned ceramic honeycomb structures are formed by the use of the extruding dies of the prior art, fins branched from partition walls forming the honeycomb structures are uneven in height and width and even if formed fins are sound in appearance, they are uneven in density so that cracks would occur when drying or firing the honeycomb structures.

With the extruding dies for producing finned ceramic honeycomb structures, moreover, it is necessary to inspect whether branched forming grooves provided in surfaces of the dies on outlet sides for ceramic materials have been formed with required accuracy in dimension without any damage. Such an inspection is a troublesome and time-consuming operation.

The inventors of the present application have investigated the problems arising in forming finned ceramic honeycomb structure by means of the extruding dies of the prior art and ascertained that the problems result from the fact that with the dies of the prior art only formed with branched forming grooves for fins, the relation between ceramic material supply holes and branched forming grooves for forming the fins is indefinite and therefore the ceramic material is not supplied into the branched forming grooves sufficiently to form complete fins although the material is uniformly supplied to form the partitions of honeycomb structures.

SUMMARY OF THE INVENTION

It is an object of the invention to provide an improved extruding die for forming finned ceramic honeycomb structures, which eliminates all the disadvantages of the prior art and which is able to easily form fins and an entire structure uniform in density, thereby completely preventing the fins from falling off during extruding and preventing cracks from occurring in drying or firing.

In order to achieve this object, in an extruding die for forming finned ceramic honeycomb structures, including extruding forming grooves for extruding a ceramic material therethrough, said extruding forming grooves opening at a front surface of the extruding die and intersecting with each other in the form of a mesh corresponding to a sectional configuration of a ceramic honeycomb structure and a plurality of material supply apertures for supplying the ceramic material into the extruding die, said material supply apertures opening at a rear surface of the extruding die and communicating with said extruding forming grooves at intersecting zones thereof. The extruding die according to the invention comprises fin forming grooves branched from said extruding forming grooves for forming fins, said material supply apertures communicating with at least parts of said fin forming grooves.

In order that the invention may be more clearly understood, preferred embodiments will be described, by way of example, with reference to the accompanying drawings.

DESCRIPTION OF THE PREFERRED EMBODIMENTS

Figure 1A:
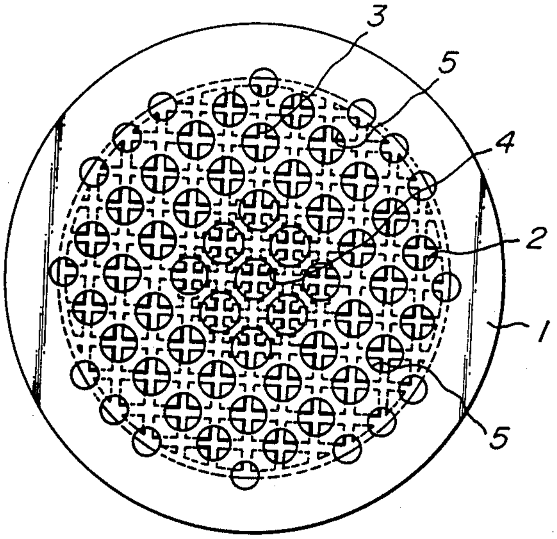
FIG. 1*a* is an end view of a preferred embodiment of an extruding die according to the invention on a ceramic material supply side.
Figure 1B:
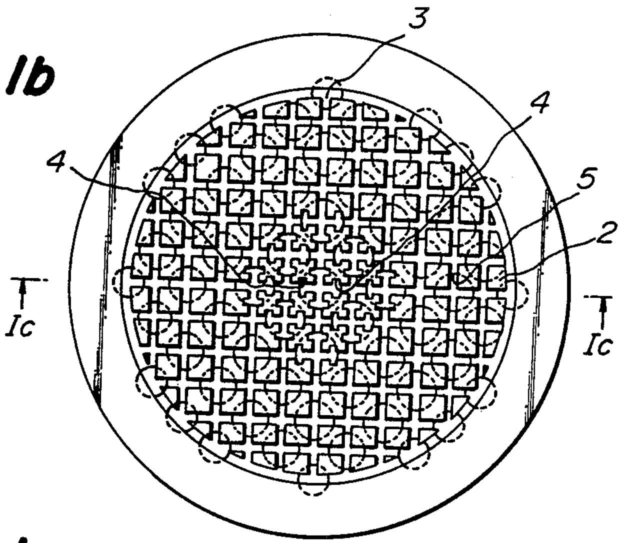
FIG. 1*b* is an end view of the die shown in FIG. 1*a* on a ceramic material exhaust side.
Figure 1C:
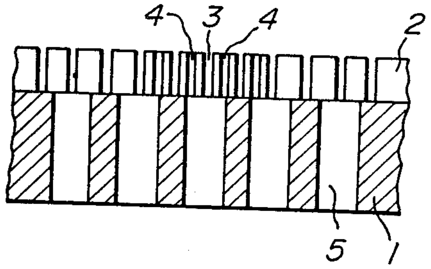
FIG. 1*c* is a sectional view of the die shown in FIG. 1*b* taken along a line IVC—IVC in FIG. 1*b;*

FIGS. 1*a,* 1*b* and 1*c* illustrate an extruding die for finned honeycomb structures as a preferred embodiment of the invention in end views on material supply and exhaust sides and a sectional view taken along a line IVC—IVC in FIG. 1*b*.

The extruding die consists of a first metal member 1 and a second metal member 2. The second metal member 2 is formed with extruding forming grooves 3 for forming partition walls of the ceramic honeycomb structure and with fin forming grooves 4 branched from the extruding forming grooves 3. The first metal member 1 is formed with material supply apertures 5 for supplying the ceramic forming material. The extruding forming grooves intersect with each other to form a mesh corresponding to a sectional configuration of the ceramic honeycomb structure to be formed.

In this manner, this extruding die for finned ceramic honeycomb structures is formed with the extruding forming grooves 3 and the fin forming grooves 4 branched therefrom which have predetermined depths from the material exhaust side to the material supply side or from the second metal member 2 toward the first metal member 1, respectively, and with a plurality of independent material supply apertures 5 from the material supply side to the material exhaust side or from the first metal member 1 toward the second metal member 2. The material supply apertures 5 form passages for causing to flow the ceramic forming material (ceramic batch) supplied from an extruder. The material supply apertures 5 are aligned with intersections of the extruding forming grooves 3 in the form of a grid and communicate with at least parts of or all the fin forming grooves 4 (FIG. 1*a*).

Figure 2A:
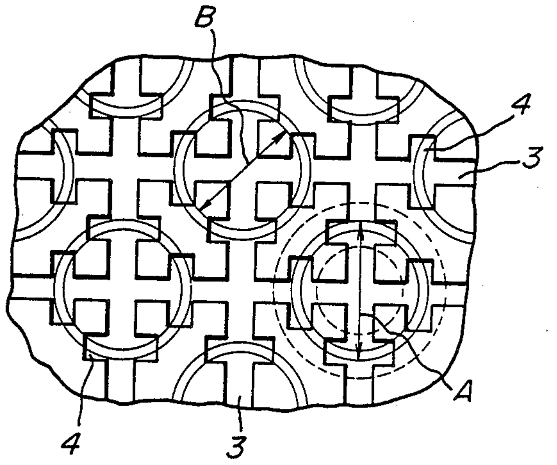
FIG. 2*a* is an enlarged view of a main part of the die on a front side.
Figure 2B:
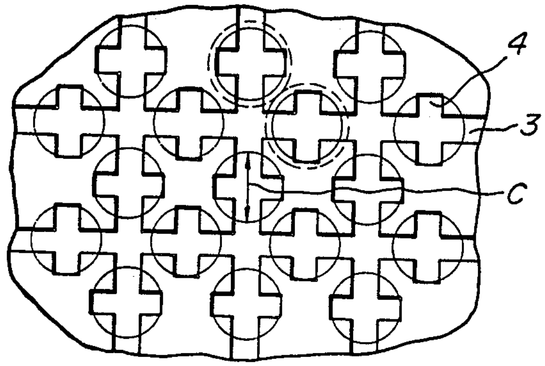
FIG. 2*b* is an enlarged view of a main part of another die according to the invention on a front side.
Figure 3A:
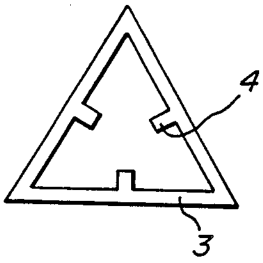
FIGS. 3*a*–3*g* illustrate various shapes of extruding forming grooves applicable to the die according to the invention.
Figure 3B:
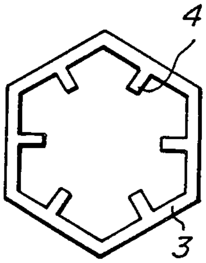
Figure 3C:
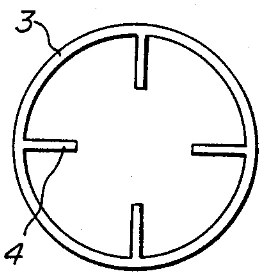
Figure 3D:
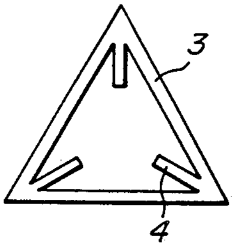
Figure 3E:
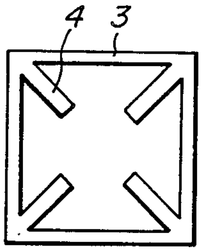
Figure 3F:
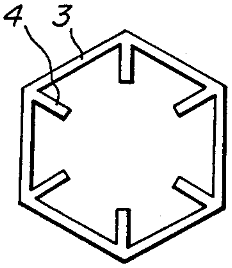
Figure 3G:
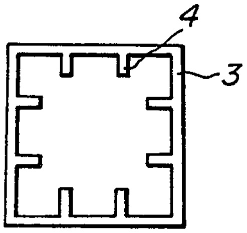

According to the invention, each material supply aperture 5 communicates with at least part of the fin forming groove 4. The relations between the material suply apertures and the fin forming grooves 4 are shown in FIGS. 2*a* and 2*b*. It is important to open the material supply apertures 5 with suitable opening diameters as shown by A, B and C in these drawings. Unsuitable openings are shown in broken lines. In FIG. 2*a,* each material supply aperture opens substantially in alignment with an intersection of the extruding forming grooves and within a circle inside the four fin forming grooves about the intersection. In FIG. 2*b,* each material supply aperture opens substantially in alignment with a fin forming groove and within a circle inside one fin forming groove.

In this embodiment of the die for extruding finned ceramic honeycomb structures, the fin forming grooves 4 are arranged only in the proximity of a center of the group of extruding forming grooves 3 (FIG. 1*b*). However, the fin forming grooves 4 may be provided over a wider zone from the center of the grooves 3 toward their outer circumference in order to obtain surface areas of the structure required for catalyzer's properties.

Although the preferred embodiment of the dies according to the invention has been explained by referring to FIGS. 1*a,* 1*b* and 1*c,* the present invention can be applicable to various extruding dies having particular configurations of the mesh formed by the intersections of the extruding forming grooves, which are polygonal in section such as triangular or hexagonal or circular, and having fin forming grooves 4 provided at mid portions or intersections of the extruding forming grooves 3 as shown in FIGS. 3*a*-3*g*.

The extruding die for finned ceramic honeycomb structures comprises the material supply apertures 5 for supplying the forming material (ceramic batch), which communicate with at least parts of the fin forming grooves 4 formed in the extruding forming grooves 3. In extruding the material to form the ceramic honeycomb structure, therefore, fins of the structure can be easily formed uniformly in density as well as the entire structure, thereby completely preventing fins from falling off during extruding or preventing cracks from occurring in drying or firing. With the extruding die according to the invention, the extruding forming grooves 3 and the fin forming grooves 4 can be directly observed through the material supply apertures 5 so that clogging and other troubles of the grooves 3 and 4 can be easily inspected.

EXAMPLE

Extruding dies according to the invention were made for forming finned ceramic honeycomb structures which had an outer diameter of 100 mm, a height of 127 mm, a partition wall thickness of 0.2 mm, a cell pitch of 1.47 mm and a cell density of 300 cells/in$^2$. Fins having a height of 0.3 mm and a width of 0.2 mm were provided on partition walls within a circle having a diameter of 50 mm at a center of the honeycomb structure.

Figure 4A:
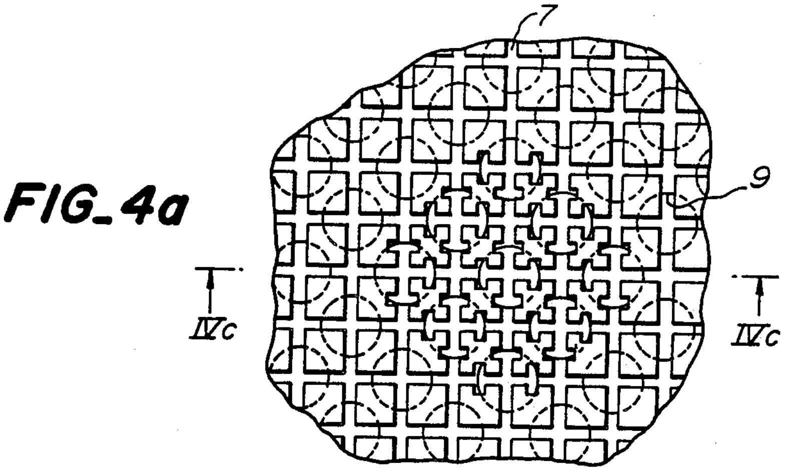
FIG. 4*a* is an enlarged view of a main part of a die manufactured in the Example of the specification on a material supply side.
Figure 4B:
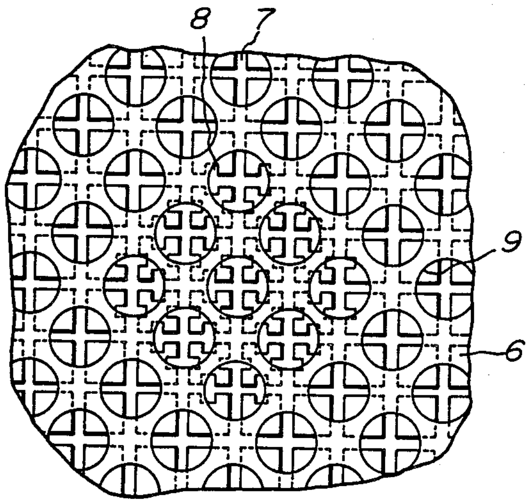
FIG. 4*b* is an enlarged view of a main part of the die on a material exhaust side.
Figure 4C:
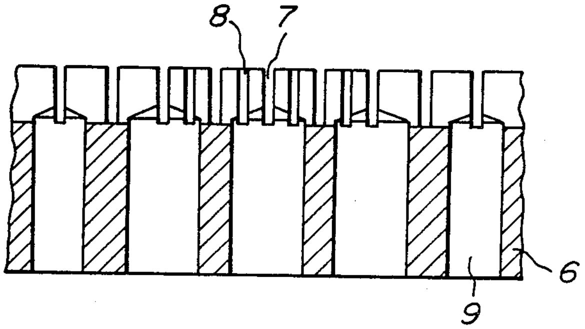
FIG. 4*c* is a partial sectional view taken along a line IVC—IVC in FIG. 4*a;*

FIGS. 4*a,* 4*b* and 4*c* illustrate principal parts of the die in end views on its material exhaust and supply sides and a sectional view taken along a line IVC—IVC in FIG. 4*a*.

As shown in the drawings, the extruding die comprises a die member 6 formed with extruding forming grooves 7 for forming partition walls of the structure, fin forming grooves 8 for forming fins and material supply apertures 9 for supplying the material.

Finned ceramic honeycomb structures were formed by the use of this extruding die. The material was prepared by kneading and conditioning a material crystallizing cordierite crystal consisting of 25% of kaolin, 22% of calcined kaolin, 38% of talc and 15% of alumina, and 3.5% of an organic extruding aid and 30% of water. Fins of honeycomb structures were inspected during extruding. There was no damage or defect of the fins.

The extruded honeycomb structures were fired at 1,400° C. The fired structures were observed on faults and cracks. There were no faults or cracks in the structures.

In this Example, the extruding die disclosed in the Japanese Patent Application Publication No. 61,592/82 was applied to the invention. However, the extruding dies disclosed in the Japanese Patent Application Publication No. 1,232/76 and the U.S. Pat. No. 3,038,201 may be applicable to the invention.

Figure 5:
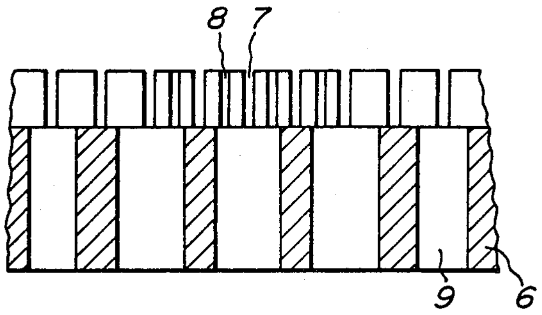
FIG. 5 is an enlarged sectional view illustrating a further embodiment of a die according to the invention.
Figure 6A:
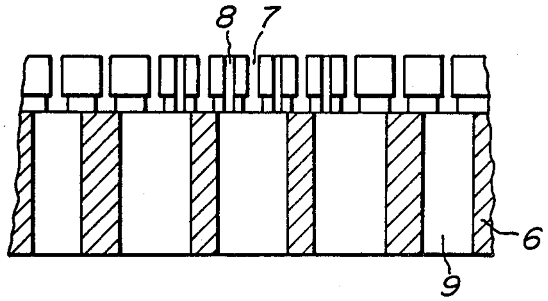
FIGS. 6*a* and 6*b* are enlarged sectional views illustrating main parts of preferable dies according to the invention.
Figure 6B:
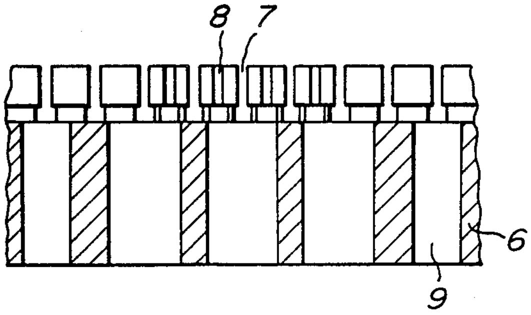
Figure 7A:
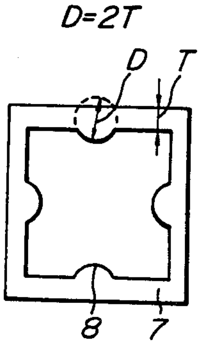
FIGS. 7*a*-7*h* illustrate various fin forming grooves for dies according to the invention.
Figure 7B:
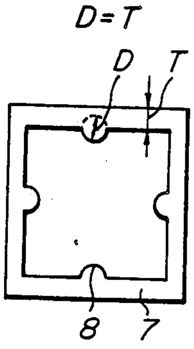
Figure 7C:
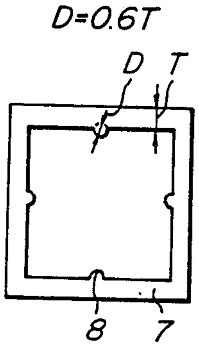
Figure 7D:
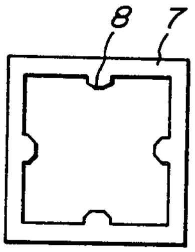
Figure 7E:
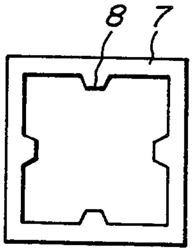
Figure 7F:
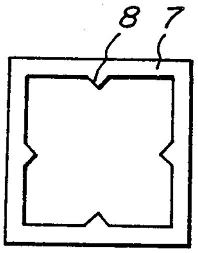
Figure 7G:
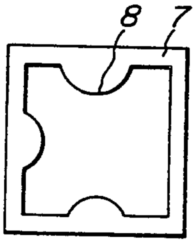
Figure 7H:
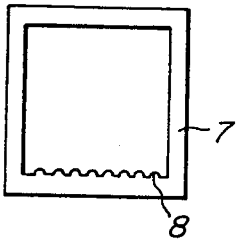

FIGS. 5 and *6a* and *6b* illustrate extruding dies in cross-section which have been modified from dies of the prior art in order to apply them to the invention.

Although the fin forming grooves for forming the fins on the partition walls of the ceramic honeycomb structures have been shown rectangular in the above example, the fin forming grooves may be circular, spherical, triangular, trapezoid grooves or chamfered rectangular grooves in section as shown in FIGS. *7a–7h.* Moreover, FIGS. *7a, 7b* and *7c* illustrate relations between thicknesses of extruding forming grooves for partitions and diameters of circular or spherical grooves. Diameters D of the circular grooves are D=2T, D=T and D=0.6T in FIGS. *7a, 7b* and *7c,* where T is a width of the extruding forming grooves.

According to the invention, it is possible to advantageously prevent the defects of fins and cracks which would unavoidably occur due to unevenness in density of extruded honeycomb structures. Moreover, the extruding die according to the invention is easy to manufacture and simple to inspect whether the extruding forming grooves and the fin forming grooves are being formed with required dimensions by directly observing these grooves through the material supply apertures or by inspecting whether any damage of these grooves occurs in use.

It is further understood by those skilled in the art that the foregoing description is that of preferred embodiments of the disclosed dies and that various changes and modifications may be made in the invention without departing from the spirit and scope thereof.

What is claimed is:

1. An extruding die for forming finned ceramic honeycomb structures, including extruding forming grooves for extruding a ceramic material therethrough, said extruding forming grooves opening at a front surface of the extruding die and intersecting with each other in the form of a mesh corresponding to a sectional configuration of a ceramic honeycomb structure; and a plurality of material supply apertures for supplying the ceramic material into the extruding die, said material supply apertures opening at a rear surface of the extruding die and communicating with said extruding forming grooves at intersecting zones thereof, said extruding die comprising fin forming grooves branched from said extruding forming grooves for forming fins, said material supply aperture communicating with at least parts of said fin forming grooves.

2. An extruding die as set forth in claim 1, wherein each said fin forming groove is provided substantially at a mid portion of an extruding forming groove between two adjacent intersections of the extruding forming grooves.

3. An extruding die as set forth in claim 2, wherein each said material supply aperture opens substantially in alignment with an intersection of the extruding forming grooves and within a circle inside the periphery of four fin forming grooves about said intersection.

4. An extruding die as set forth in claim 2, wherein each said material supply aperture opens substantially in alignment with a fin forming groove and outside of a circle inscribing one fin forming groove.

5. An extruding die as set forth in claim 1, wherein said fin forming grooves are arranged only in the proximity of the central portion of the extruding die.

6. An extruding die as set forth in claim 1, wherein said mesh formed by intersections of said extruding forming grooves has a configuration in section selected from triangular, square, hexagonal and circular configurations.

7. An extruding die as set forth in claim 1, wherein said fin forming grooves are provided at intersections of the extruding forming grooves.

8. An extruding die as set forth in claim 1, wherein said fin forming grooves are of a shape in section selected from circular, triangular, rectangular, trapezoid and chamfered rectangular shapes.

9. An extruding die as set forth in claim 8, wherein said fin forming grooves are circular in section wherein the diameter D is within the range of 0.6T–2T, where T is the width of the extruding forming grooves.

* * * * *